(12) United States Patent
Stener

(10) Patent No.: US 11,951,951 B2
(45) Date of Patent: *Apr. 9, 2024

(54) VEHICULAR MOUNTED RAIL SYSTEM

(71) Applicant: Yonder Fund LLC, Dallas, TX (US)

(72) Inventor: Gavin Stener, Dallas, TX (US)

(73) Assignee: Yonder Fund LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,109

(22) Filed: Jan. 9, 2023

(65) Prior Publication Data

US 2023/0158960 A1     May 25, 2023

Related U.S. Application Data

(63) Continuation of application No. 17/027,603, filed on Sep. 21, 2020, now Pat. No. 11,572,021, which is a continuation-in-part of application No. 16/779,288, filed on Jan. 31, 2020, now abandoned.

(51) Int. Cl.

| | |
|---|---|
| *F16M 13/02* | (2006.01) |
| *B60R 7/00* | (2006.01) |
| *B60R 7/06* | (2006.01) |
| *B60R 11/00* | (2006.01) |
| *F16M 11/20* | (2006.01) |
| *F16M 11/14* | (2006.01) |

(52) U.S. Cl.
CPC ............... *B60R 7/06* (2013.01); *B60R 11/00* (2013.01); *B60R 2011/0005* (2013.01); *B60R 2011/0084* (2013.01); *B60R 2011/0089* (2013.01); *F16M 11/14* (2013.01); *F16M 11/2085* (2013.01); *F16M 13/02* (2013.01)

(58) Field of Classification Search
CPC ... B60R 7/06; B60R 11/00; B60R 2011/0005; B60R 2011/0089; B60R 2011/0084; F16M 13/02; F16M 11/2085; F16M 11/14
See application file for complete search history.

(56) References Cited

U.S. PATENT DOCUMENTS

| | | | |
|---|---|---|---|
| 892,105 A | 6/1908 | White | |
| 1,536,985 A | 5/1925 | Swinford | |
| D208,918 S | 10/1967 | Dole et al. | |
| D225,204 S | 11/1972 | Kendrick | |
| 4,073,113 A * | 2/1978 | Oudot | F16B 7/0486 |
| | | | 403/189 |
| D251,467 S | 4/1979 | Anderson | |
| D271,312 S | 11/1983 | Renteria | |
| D275,065 S | 8/1984 | Steiner | |
| 4,469,261 A | 9/1984 | Stapleton et al. | |
| D282,759 S | 2/1986 | Weissberg | |
| 4,596,406 A | 6/1986 | Van Vleet et al. | |
| D290,719 S | 7/1987 | Holloway | |
| D291,785 S | 9/1987 | Rahme | |

(Continued)

FOREIGN PATENT DOCUMENTS

| | | |
|---|---|---|
| CN | 304763109.5 | 8/2018 |
| TW | D183200 | 5/2017 |

*Primary Examiner* — Tan Le

(74) *Attorney, Agent, or Firm* — Foley & Lardner LLP

(57) ABSTRACT

A vehicular mounted rail system may provide a rail, base(s), and rail adapter that are configured to be assembled and mounted to a structural member (e.g., dashboard) of a vehicle so as to enable a user to support an electronic device by the structural member.

30 Claims, 11 Drawing Sheets

(56) References Cited

U.S. PATENT DOCUMENTS

| | | | |
|---|---|---|---|
| 4,948,313 A | 8/1990 | Zankovich | |
| D317,331 S | 6/1991 | Holloway | |
| D317,950 S | 7/1991 | Tse | |
| 5,154,385 A * | 10/1992 | Lindberg | A47B 57/562 |
| | | | 248/245 |
| 5,231,785 A | 8/1993 | Roberts | |
| 5,271,586 A * | 12/1993 | Schmidt | F16B 37/046 |
| | | | 248/68.1 |
| 5,279,711 A | 1/1994 | Frankeny et al. | |
| 5,305,700 A | 4/1994 | Strong et al. | |
| 5,395,131 A | 3/1995 | Herrick | |
| D357,400 S | 4/1995 | Sachs | |
| D360,571 S | 7/1995 | Perry | |
| D373,761 S | 9/1996 | Yu | |
| D374,165 S | 10/1996 | Marshall | |
| D375,065 S | 10/1996 | Duvernay et al. | |
| D375,765 S | 11/1996 | Kawasaki | |
| D376,780 S | 12/1996 | McCoy | |
| D378,302 S | 3/1997 | Kin-Man Tse | |
| D390,709 S | 2/1998 | Moore | |
| 5,786,807 A | 7/1998 | Couch et al. | |
| D399,847 S | 10/1998 | Seifert | |
| D401,496 S | 11/1998 | Lambert et al. | |
| 5,839,744 A | 11/1998 | Marks | |
| 5,855,342 A | 1/1999 | Hawkins et al. | |
| 5,890,726 A | 4/1999 | McCoy et al. | |
| 5,893,744 A | 4/1999 | Wang | |
| D409,182 S | 5/1999 | Tyler | |
| 5,927,041 A | 7/1999 | Sedlmeier et al. | |
| D414,761 S | 10/1999 | Oikawa et al. | |
| 5,984,243 A | 11/1999 | Pfaller et al. | |
| D440,845 S | 4/2001 | Lackey | |
| D443,566 S | 6/2001 | Peterson | |
| D455,199 S | 4/2002 | Lenart et al. | |
| D506,916 S | 7/2005 | Sale, Jr. | |
| D510,696 S | 10/2005 | Sale, Jr. | |
| D521,314 S | 5/2006 | Ball | |
| 7,070,374 B2 * | 7/2006 | Womack | B60P 7/0815 |
| | | | 410/104 |
| D526,939 S | 8/2006 | Profitt et al. | |
| D534,061 S | 12/2006 | Sakai | |
| D551,937 S | 10/2007 | Krumpe et al. | |
| D554,137 S | 10/2007 | Richter | |
| 7,320,450 B2 | 1/2008 | Carnevali | |
| 7,324,050 B2 | 1/2008 | Chung et al. | |
| D567,060 S | 4/2008 | Busalt et al. | |
| 7,401,995 B2 | 7/2008 | Senakiewich, II | |
| 7,448,822 B2 | 11/2008 | Nebeker et al. | |
| D587,713 S | 3/2009 | Sutton | |
| D592,487 S | 5/2009 | Tedesco et al. | |
| D594,735 S | 6/2009 | Hofer | |
| D599,829 S | 9/2009 | Jorgensen et al. | |
| 7,604,444 B2 | 10/2009 | Wu | |
| D607,381 S | 1/2010 | Lekkas | |
| 7,757,424 B2 | 7/2010 | Follmar | |
| 7,774,973 B2 | 8/2010 | Carnevali | |
| 7,849,630 B2 | 12/2010 | Carnevali | |
| 8,100,600 B2 | 1/2012 | Blum | |
| D657,783 S | 4/2012 | Mo | |
| D658,184 S | 4/2012 | Chang et al. | |
| D658,478 S | 5/2012 | Wall | |
| D673,443 S | 1/2013 | Elrod | |
| D674,681 S | 1/2013 | Gorman | |
| D686,622 S | 7/2013 | Rey et al. | |
| 8,497,760 B2 | 7/2013 | Whalen et al. | |
| D691,027 S | 10/2013 | Rainer | |
| D698,357 S | 1/2014 | Mainville et al. | |
| D699,176 S | 2/2014 | Salomon et al. | |
| D703,998 S | 5/2014 | Funnell et al. | |
| D718,298 S | 11/2014 | Aspinall et al. | |
| D720,199 S | 12/2014 | Clements et al. | |
| D722,815 S | 2/2015 | Fuller et al. | |
| 8,944,399 B2 | 2/2015 | Sutherland et al. | |
| D723,559 S | 3/2015 | Hein et al. | |
| D732,519 S | 6/2015 | Aspinall et al. | |
| D732,932 S | 6/2015 | Ng et al. | |
| D733,116 S | 6/2015 | Aspinall et al. | |
| D735,722 S | 8/2015 | Amann | |
| D736,595 S | 8/2015 | Moore et al. | |
| D740,589 S | 10/2015 | Ng | |
| D741,689 S | 10/2015 | Metzler | |
| D748,640 S | 2/2016 | Hart | |
| D749,405 S | 2/2016 | White | |
| D750,951 S | 3/2016 | Fuller et al. | |
| D752,976 S | 4/2016 | Koffel et al. | |
| D753,983 S | 4/2016 | Toye | |
| D754,527 S | 4/2016 | Green et al. | |
| D759,465 S | 6/2016 | Reed | |
| D760,066 S | 6/2016 | Krenek | |
| D761,094 S | 7/2016 | Hooten | |
| D764,597 S | 8/2016 | Kujawski et al. | |
| D772,689 S | 11/2016 | Zimmer | |
| 9,494,400 B1 | 11/2016 | Allemann et al. | |
| 9,506,600 B1 | 11/2016 | Li | |
| D776,091 S | 1/2017 | Spio | |
| D780,480 S | 3/2017 | Prince et al. | |
| D789,177 S | 6/2017 | Carnevali | |
| D790,325 S | 6/2017 | Gupta | |
| D790,545 S | 6/2017 | Dannenberg et al. | |
| 9,671,060 B1 | 6/2017 | Cifers | |
| D792,418 S | 7/2017 | Stener | |
| 9,717,329 B2 | 8/2017 | Hazzard et al. | |
| D799,067 S | 10/2017 | Forsberg | |
| D799,690 S | 10/2017 | Kawamura et al. | |
| D807,152 S | 1/2018 | Hansen | |
| D808,243 S | 1/2018 | Clements et al. | |
| 9,863,576 B1 | 1/2018 | Cifers | |
| 9,879,819 B1 | 1/2018 | Cifers | |
| D810,008 S | 2/2018 | Mollison et al. | |
| D810,076 S | 2/2018 | Lee et al. | |
| D812,056 S | 3/2018 | Guermeur | |
| 9,923,511 B2 | 3/2018 | Xie | |
| D816,373 S | 5/2018 | Schwandt et al. | |
| D818,349 S | 5/2018 | White | |
| 10,027,273 B2 | 7/2018 | West et al. | |
| D828,482 S | 9/2018 | Alldredge et al. | |
| D834,020 S | 11/2018 | Pascucci | |
| D839,216 S | 1/2019 | Kim et al. | |
| D843,199 S | 3/2019 | Stener | |
| D848,671 S | 5/2019 | Neuhaus et al. | |
| D849,502 S | 5/2019 | Lucic, III | |
| D860,198 S | 9/2019 | Engwall et al. | |
| D860,522 S | 9/2019 | Zhan | |
| D868,010 S | 11/2019 | Bard et al. | |
| D879,671 S | 3/2020 | Siegel | |
| D884,661 S | 5/2020 | Kim et al. | |
| 11,572,021 B2 * | 2/2023 | Stener | B60R 11/00 |
| 11,635,155 B2 | 4/2023 | Carnevali | |
| 2001/0045725 A1 | 11/2001 | McCoy et al. | |
| 2002/0166936 A1 | 11/2002 | Carnevali | |
| 2004/0251388 A1 | 12/2004 | Williams | |
| 2005/0045779 A1 | 3/2005 | Nan | |
| 2005/0092876 A1 | 5/2005 | Carnevali | |
| 2005/0104327 A1 | 5/2005 | Irgens et al. | |
| 2006/0000957 A1 | 1/2006 | Carnevali | |
| 2006/0279067 A1 | 12/2006 | Irgens et al. | |
| 2007/0120036 A1 | 5/2007 | Olle et al. | |
| 2008/0115344 A1 | 5/2008 | Carnevali | |
| 2008/0272574 A1 | 11/2008 | Stuart | |
| 2009/0026730 A1 | 1/2009 | Frantz | |
| 2009/0079164 A1 | 3/2009 | Columbia | |
| 2009/0253521 A1 | 10/2009 | Arden et al. | |
| 2010/0276558 A1 | 11/2010 | Faust et al. | |
| 2012/0045276 A1 | 2/2012 | Carnevali | |
| 2013/0248668 A1 | 9/2013 | Lu et al. | |
| 2015/0030386 A1 | 1/2015 | Carnevali | |
| 2018/0306233 A1 | 10/2018 | Burton | |
| 2018/0345476 A1 | 12/2018 | Carnevali | |
| 2018/0347749 A1 | 12/2018 | Carnevali | |
| 2018/0363842 A1 | 12/2018 | Carnevali | |

\* cited by examiner

VEHICULAR MOUNTED RAIL SYSTEM

CROSS-REFERENCE TO RELATED PATENT APPLICATIONS

This application is a Continuation of U.S. Non-Provisional application Ser. No. 17/027,603, filed Sep. 21, 2020, which is a Continuation-In-Part of U.S. Non-Provisional application Ser. No. 16/779,288, filed on Jan. 31, 2020, the disclosures of which are hereby incorporated by reference in their entirety.

BACKGROUND

With the wide adoption of mobile electronic devices, such as smartphones and tablets, the use of the mobile electronic devices in everyday life has become pervasive. Mobile apps, such as mapping apps for driving directions, has become commonly used by drivers and vehicles, both for consumer and commercial uses.

One challenge for users of the mobile devices in vehicles is safety in using the mobile devices when driving because holding the device leaves only one hand to control the steering wheel, and placing the electronic device on a lap, seat, or center console pulls a driver's attention away from the road. To help with safety for drivers when using mobile devices, aftermarket electronic device mounting systems that are mounted onto a dashboard have been developed. Existing mounting systems, however, are often not easily connected to dashboards as a result of vehicular dashboards often having complex and/or compound shapes (e.g., surfaces that are not linear), and, thus, problematic for the mounting systems to be adapted to the dashboard and be sufficiently stable to support the mobile devices. As such, there is a need for a vehicular mobile device mounting system that offers ease of installation and stability in supporting mobile electronic devices.

BRIEF SUMMARY

To overcome the shortcomings of existing dashboard mounting systems for supporting mobile electronic devices, a dashboard mounting system may include a rail defined by a pair of sidewalls with external walls having an inwardly acute angle relative to a bottom surface of a bottom wall of the rail. The sidewalls may each include top walls that extend over internal walls of the sidewalls, where a gap separates the top surfaces so as to form a rail feature. The bottom wall of the rail may define a pair of recessed openings that enable a user to directly or indirectly mount the rail to a dashboard of a vehicle. In an embodiment, the top walls may have semi-circles defined in each one directly above the recessed openings, thereby enabling a fastener to be extended therethrough and simplify mounting of the rail to the dashboard. Additionally, the recessed openings and spaces defined by the semi-circles in the top surfaces may enable the manufacturer to use a single tool to both carve the semi-circles into the top surface and form the recessed opening in the base. In an embodiment, internal walls of the sidewalls, top surface of bottom wall, and bottom surfaces of the top walls may form a channel with a defined shape, such as a geometric (e.g., star, triangle, etc.) or non-geometric shape (e.g., curvilinear with abstract shapes). A base of a ball mount that extends into the channel may have a reciprocal defined shape, thereby enabling the ball mount to slide into and along the channel and through the rail feature to a desired position along the rail to lock the ball mount.

In an alternative embodiment, rather than using a rail with a channel of the rail, a bar mount that defines one or more fixed positions for a bar mount adapter may be provided. The fixed position(s) may be configured to resist or prevent rotation of the bar mount adapter during use, for example. In an embodiment, one or more anti-rotation features may be included at the fixed position and base of the bar mount adapter, where the anti-rotation feature(s) may include, but not be limited to, shape of recess or seat for the base of the bar mount adapter to reside, one or more protrusions, one or more corresponding recesses, or any combination thereof, where the feature(s) are offset from an axial center location of the bar mount adapter and reciprocal to engage with one another. In an embodiment, the bar mount adapter may include a ball, stem, and base formed from a single material (i.e., a single unit). Alternative configurations of the bar mount adapter may be utilized (e.g., multiple components that are connected together).

One embodiment of the present disclosure relates to a mounting system for supporting an electronic device. The mounting system may include a mount, an adapter, and a base component. The mount may include a first opening. The adapter may include a first feature configured to be supported by the mount. The first feature may be configured to mate with the mount to prevent relative rotation between the mount and the adapter. The base component may be configured to enable securing the mount to a structural feature of a system in which the mounting system is being transported while supporting the electronic device.

Another embodiment of the present disclosure relates to an adapter for use in a mounting system for supporting an electronic device. The adapter may include an adapter feature, a shaft, a base, and a feature coupled to the base. The shaft may include a first axial end and a second axial end. The first axial end of the shaft may be connected to the adapter feature. The base may be connected to the second axial end of the shaft. The feature may be configured to mate with a mount to prevent rotation of the base relative to the mount.

Yet another embodiment of the present disclosure relates to a method of installing a mounting system for supporting an electronic device. The method may include mating a first feature of an adapter to a mount inclusive of a second feature that is shaped reciprocal to the first feature. The first feature may be configured to prevent relative rotation between the adapter and the mount when the second feature is mated with the first feature. The method may also include aligning a first opening of the mount with a second opening defined by a base component. The method may further include security the mount to a structural feature of a system in which the mounting system is to be transported while supporting the electronic device by connecting the base component to the mount using a fastening member that extends into the first opening and the second opening.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
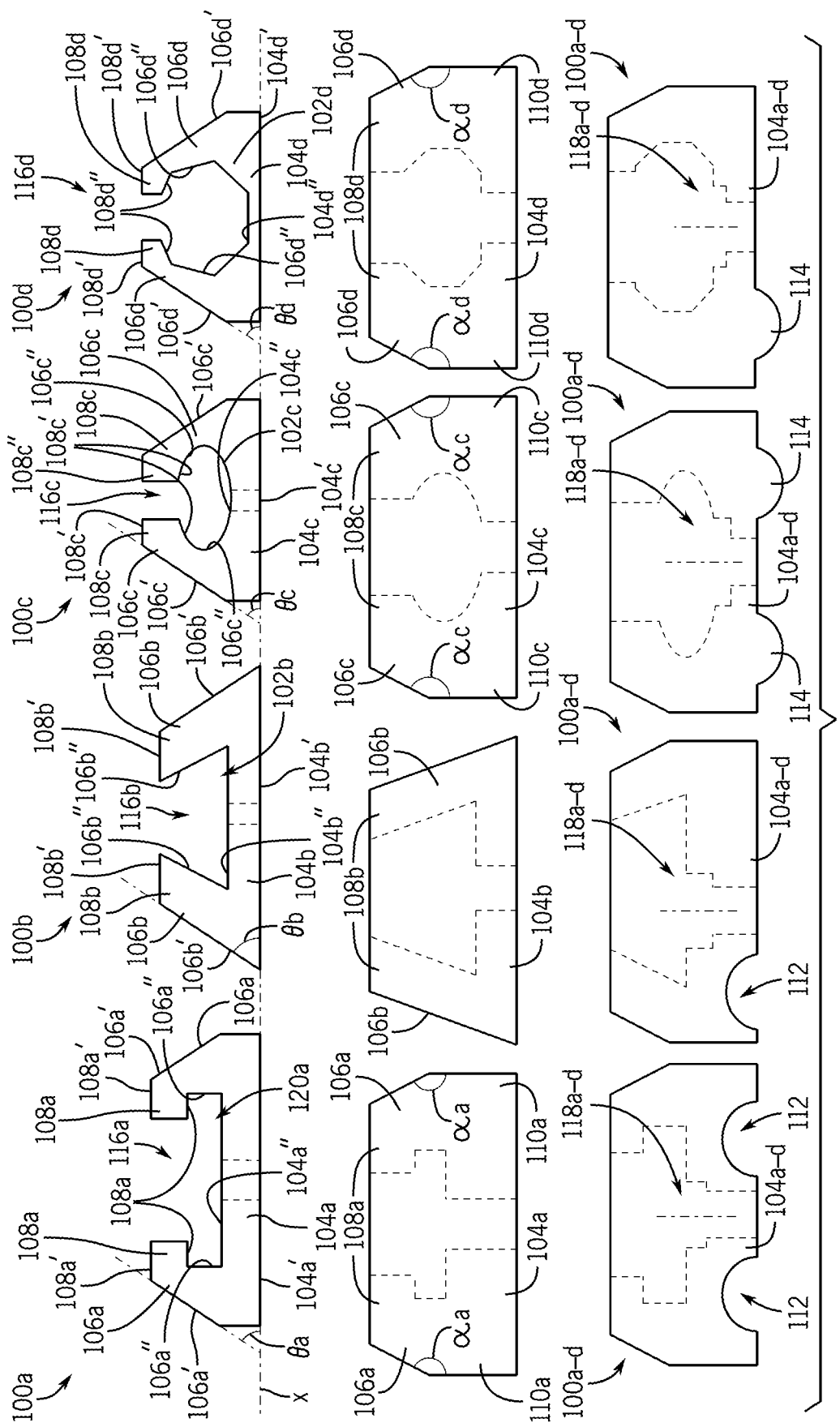
FIG. 1 shows illustrations of a number of different illustrative embodiments of a rail that is part of a rail mount system for mounting to a dashboard of a vehicle so as to support an electronic device.

With regard to FIG. 1, a number of different embodiments of a rail 100a-100d that is part of a rail mount system for mounting to a dashboard of a vehicle so as to support an electronic device are shown. The rails 100a-100d are shown along a top row to include a number of channels with different internal rail profiles 102a-102d defined by a bottom wall 104a-104d having bottom surfaces 104a'-104d' and inner surfaces 104a"-104d", sidewalls 106a-106d having outer surfaces 106a'-106d' and inner surfaces 106a"-106d", and top walls 108a-108d (if included) having outer surfaces 108a' 108d' and inner or bottom surfaces 108a"-108d". In each of the embodiments, the side walls 106a-106d have outer surfaces 106a'-106d' that are angled inward or are acute relative to a plane X along which the bottom surface 104a'-104d' of the bottom wall 104a-104d extends. In an embodiment, an angle θa-θd defines the acute angle. The external or outer profile of each rail 100a-100d may be trapezoidal or generally trapezoidal, where being generally trapezoidal may mean that the walls 106a-106d may have other features or angles that deviate from being a perfect trapezoid. For example, a feature 110a-110d may extend upwards along and/or from the respective bottom wall 104a-104d so as to meet the respective side wall 106a-106d at a defined angle αa-αd. The side wall 106a-106d thereafter may be angled upward and inward. By using acute angles, rotation of the bottom wall 104a-104d may be minimized when engaged or attached to base(s), such as outer base(s) and intermediate base(s) (collectively base(s)), that mount to a surface of a dashboard.

It should be understood that non-trapezoidal profiles of the rail 100a-100d may be utilized, but provide for the same or similar functionality as a rail with a trapezoidal profile. In an embodiment, the non-trapezoidal profile may have a hexagonal or other geometric profile (e.g., spline profile). The outer profile of the rail 100a-100d may be symmetric or non-symmetric across hemispheric axes (i.e., side-to-side or top-to-bottom). Although the rail 100a-100d is shown to be longitudinally or axially linear, it should be understood that the rail may be curved (e.g., semi-circular, s-shaped, triangular, or otherwise). If the rail 100a-100d is not linear or not completely linear, then the base(s) (e.g., bases 200a-200c shown in FIG. 2) may be shaped (e.g., curved, curved in part, straight in part) to be able to slide at least partially along the rail for installation or movement. Similarly, any rail adapters (e.g., track balls 300a-300c (FIG. 5), 900a-900b (FIG. 6), 1300a-1300b (FIG. 7)) to be utilized with the non-linear rail may be shaped to be able to mount to or at least partially slide along the rail.

The outer base(s) and intermediate base(s) (collectively "bases") may define reciprocal profiles to the profile of the bottom and outer surfaces of the rail so as to provide a friction fit that resists or prevents relative rotation between the base(s) and rail. By using outer base(s) and intermediate base(s) that have internal profiles that may reciprocally match a standard external rail profile, but have different external profiles that may match the profile of a dashboard, a common rail may be utilized for different surface shapes of vehicles, thereby minimizing or eliminating the need to produce a rail with different shaped profiles (i.e., the external sides of the base and/or sidewalls may be common for different structural features of vehicles). It should be understood that the internal profile of the base(s) may be reciprocal to the outer profile of the rail, thereby enabling the base(s) to resist relative rotational motion between the base(s) and the rail.

The outer base(s) and intermediate base(s) may be formed of any material, such as plastic, epoxy, steel, aluminum, or otherwise, and be sufficiently rigid or resistant to bending when engaged with the rail to maintain the rail in a fixed position when in use in a vehicle. The intermediate base(s) may be used when the rail is long and additional support along the rail is desired. An opening 120a-120d (see FIG. 4) defined by the bottom wall 104a-104d of the rail between the recessed openings 118a-118d may be threaded so as to enable a fastening member, such as a screw, to secure the intermediate base to the rail. The opening 120a-120d may be recessed or not recessed because the rail adapter may not need to slide past the intermediate base.

The bottom wall 104a-104d and sidewalls 106a-106d of the rail 100a-100d may be monolithic and formed from the same material at the same time using an extrusion or other process to forge or produce the rail. Alternatively, different processes may be used to form the rail 100a-100d, where the bottom wall 104a-104d and sidewalls 106a-106d may be made of the same or different materials. The material of the rail 100a-100d may be metal, such as steel, aluminum, or otherwise, plastic, ceramic, or otherwise.

In an embodiment shown in FIG. 1, the bottom wall 104a-104d may have one or more bottom features 112 and/or 114 that may operate as keys or alignment features to engage with another portion of the rail system. The features 112 and/or 114 may be used to help reduce or minimize translation of the rail 100a-100d due to motion of a vehicle, as well. The bottom wall 104a-104d further includes one or more recessed openings 118a-118d disposed therethrough, and one or more intermediate openings 120a-120d (see FIG. 4) disposed therethrough between the recessed openings 118a-118d for attaching the rail 100a-100d to a structural feature. A rail adapter, such as a trackball (e.g., trackballs 300a-300c of FIG. 5, trackballs 900a-900b of FIG. 6, or trackballs 1300a-1300b of FIG. 7), may have a base feature (e.g., base 302a-302c, 902a-902b, 1302a-1302b) that extends into and is maintained by a channel with the internal rail profile 102a-102d, where the rail adapter may slide along the rail 100a-100d when not in a locked state. When in a locked state, the rail adapter may be prevented from moving along the rail 100a-100d. To insert the rail adapter into the rail 100a-100d, the base of the rail adapter may be extended through a side opening 116a-116d of the rail. The base of the rail adapter may include either a male or female feature to operate as an anti-rotation feature that is reciprocal to a female or male feature of the rail such that when the base of the trackball engages the rail, the trackball is prevented from rotating, the details of which are discussed below with reference to the embodiments of FIGS. 5-7.

Figure 2:
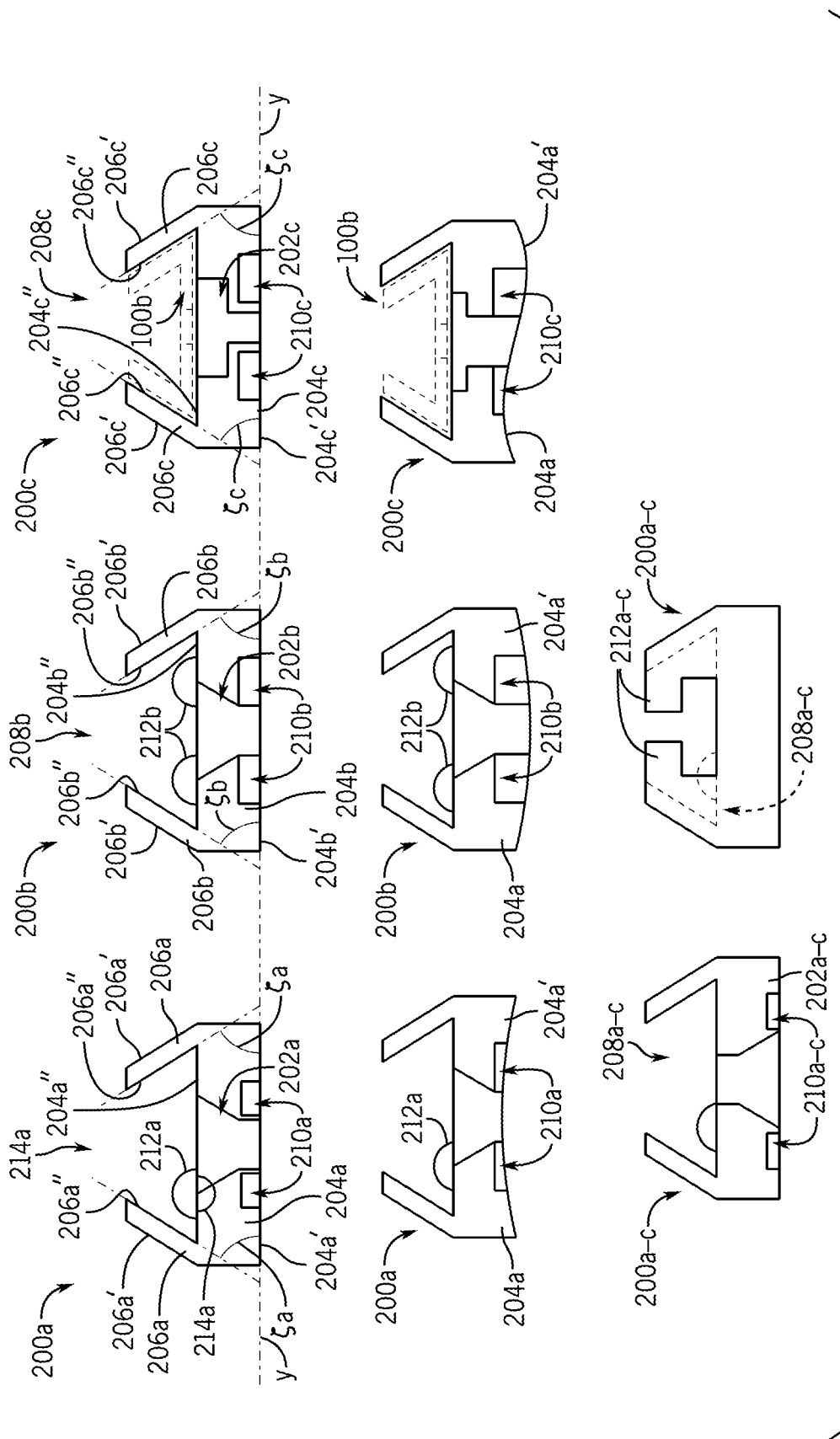
FIG. 2 shows illustrations of illustrative bases that define a recessed opening into which a fastener with a profile that is reciprocal to a profile of the recessed opening to secure the bases to a structural member of a vehicle.

With regard to FIG. 2, illustrations of illustrative bases 200a-200c are shown to define a recessed opening 202a-202c into which a fastener (see, for example, bolt 600 shown in FIG. 3) with a profile that is reciprocal to a profile of the recessed opening 202a-202c. It should be understood that multiple recessed openings 202a-202c may be disposed along the base of the rail. The fastener, such as a screw, may extend into the recessed opening 202a-202c and through an opening in a dashboard so as to secure the rail to the dashboard (see, for example, base 200a coupling rail 100b to dashboard 400 in FIG. 3). The recessed opening 202a-202c may have a variety of different profiles, such as frusto-conical (see, for example, recessed openings 202a, 202b), rectangular (see, for example, recessed opening 202c), or other profile shape, and fasteners may have reciprocal profiles. In any case, the fasteners may be configured to be fully disposed within the profile defined by the recessed opening 202a-202c, thereby enabling a rail adapter (e.g., trackball 300a-300c) to slide through a channel defined by the rail without obstruction by the fastener.

The bases 200a-200c further include a bottom wall 204a-204c having a bottom surface 204a'-204c' and an inner surface 204a"-204c". The bases 200a-200c further include a side wall 206a-206c having an outer surface 206a'-206c' and an inner surface 206a"-206c". The inner surfaces 204a"-204c" of the bottom wall 204a-204c and the inner surfaces 206a"-206c" of the side walls 206a-206c collectively define an opening 208a-208c having a profile that is reciprocal to an outer profile of the rail 100a-100d, such that the base 200a-200c can slide onto at least a portion of the rail 100a-100d from an end of the rail 100a-100d. The recessed openings 202a-202c can then be aligned with corresponding openings 118a-118d in the rail 102a-102d, so as to facilitate receiving a fastener therethrough for coupling the rail 102a-102d to, for example, a vehicle dashboard. In each of the embodiments, the inner surfaces 206a"-206c" are angled inward or are acute relative to a plane Y along which the bottom surface 204a'-204c' of the base 204a-204c extends. An angle ∂a-c defines the acute angle. The acute angle ∂a-c of the inner surfaces 206a"-206c" of the side walls 206a-206c and the complementary acute angle θa-d of the outer surfaces 106a'-106d' of the side walls 106a-106d can, advantageously, help to prevent relative rotational movement between the base 200a-200c and rail 100a-100d when the base 200a-200c is coupled to the rail 100a-100d.

Because the mounting system may include the use of different attachment mechanisms for attaching the rail 100a-100d to the dashboard (e.g., dashboard 400 shown in FIG. 3), a recess 210a-210c may be defined on the bottom surface 204a-204c of the base. For example, the recess 210b-210c may be defined to enable a head of a rivnut to be positioned on/in the dashboard and allow the base to be mounted directly or indirectly to the dashboard.

As further shown, the bottom surface 204a'-204c' of the base 200a-200c may be flat (as shown in the top row) or have different shaped profiles (as shown in the middle row).

The bottom surface 204a'-204c' may have the different profiles so as to match different dashboard surface profiles to which the rail 100a-100d may be mounted. The different profiles may be linear (as shown in the top row), curved (as shown in the middle row), linear and curved, or otherwise depending on the profile of the dashboard. By reciprocally shaping the bottom surface 204a'204c' of the base 200a-200c, maximum contact of the bottom surface along the dashboard may be maintained. It should be understood that rather than the based 200a-200c being mounted directly to the dashboard, an intervening plate or component may be mounted directly to the dashboard and the rail 100a-100d may be mounted directly to the intervening plate or component.

In an embodiment, the base 200a-200c may be dynamic in that a curable fluid (e.g., epoxy) or set of fluids may be maintained or added to a flexible pouch, mixed within the pouch, and molded to the dashboard so as to have a reciprocal shape as the dashboard. By using a curable fluid and allow a user to shape the base 200a-200c to the dashboard, a generic rail may be provided to users for molding the rail to the various shapes of dashboards and locations on the dashboards to which the users decide to mount the rail. Rather than the rail having the curable fluid, another component to which the rail may mount may include the curable fluid. In such a configuration, the base of the rail may have a profile with a flat bottom and the top surface of the component may be flat so as to enable the rail to mount to the flat top surface of the component.

Figure 3:
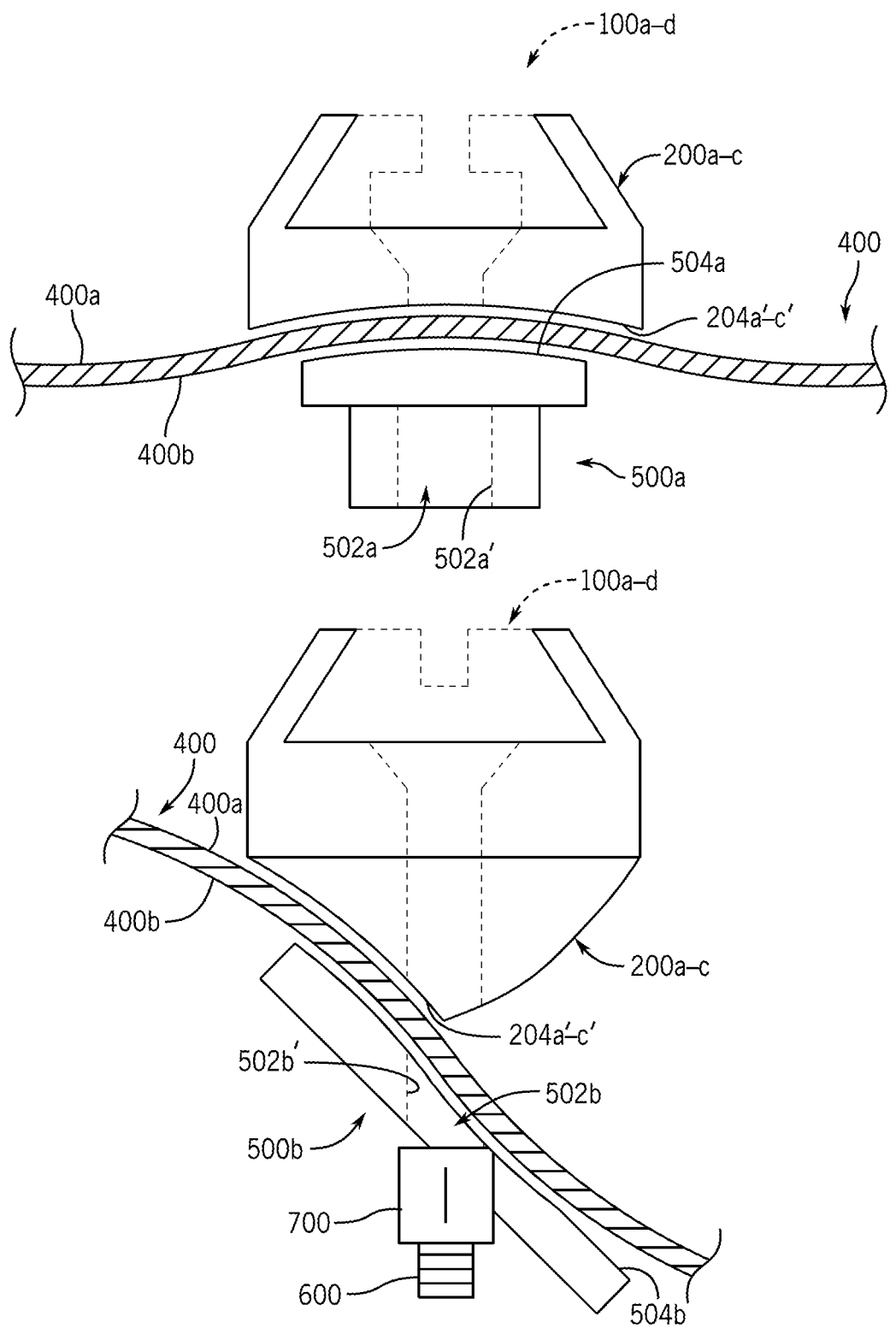
FIG. 3 shows illustrations of illustrative retention or sub-base components configured to be disposed below a surface of a dashboard and be configured to enable a connection or fastening device, such as a bolt, to extend therethrough so as to retain the rail and sub-base component on respective sides of the surface of the dashboard.

With regard to FIG. 3, sub-base components 500a-500b are shown to be configured to be disposed below a bottom side surface 400b of a dashboard 400 and be configured to enable a fastening device, such as a bolt 600, to extend therethrough so as to retain the rail 100a-100d and sub-base component 500a-500b on respective sides 400a, 400b of the dashboard 400. That is, the sub-base component 500a-500b may include a recess 502a-502b with threaded sides 502a'-502b', for example, that a threaded fastening device (e.g., bolt 600) engages, thereby tightening the sub-base component 500a-500b against the bottom side surface 400b of the dashboard 400 and tightening the rail 100a-100d to the upper side surface 400a of the dashboard 400. As shown, the sub-base component 500a-500b may have an upper side surface 504a-504b with a profile that reciprocally matches the bottom side surface 400b of the dashboard 400, while the bottom surface 204a'-204c' of the base 200a-200c and/or intervening component may have a profile that reciprocally matches the upper side surface 400a of the dashboard 400. A nut 700 may be additionally and/or alternatively used to engage the fastening device (e.g., bolt 600) beneath or within the sub-base component 500a-500b such that the sub-base component 500a-500b does not need to be threaded.

Figure 4:
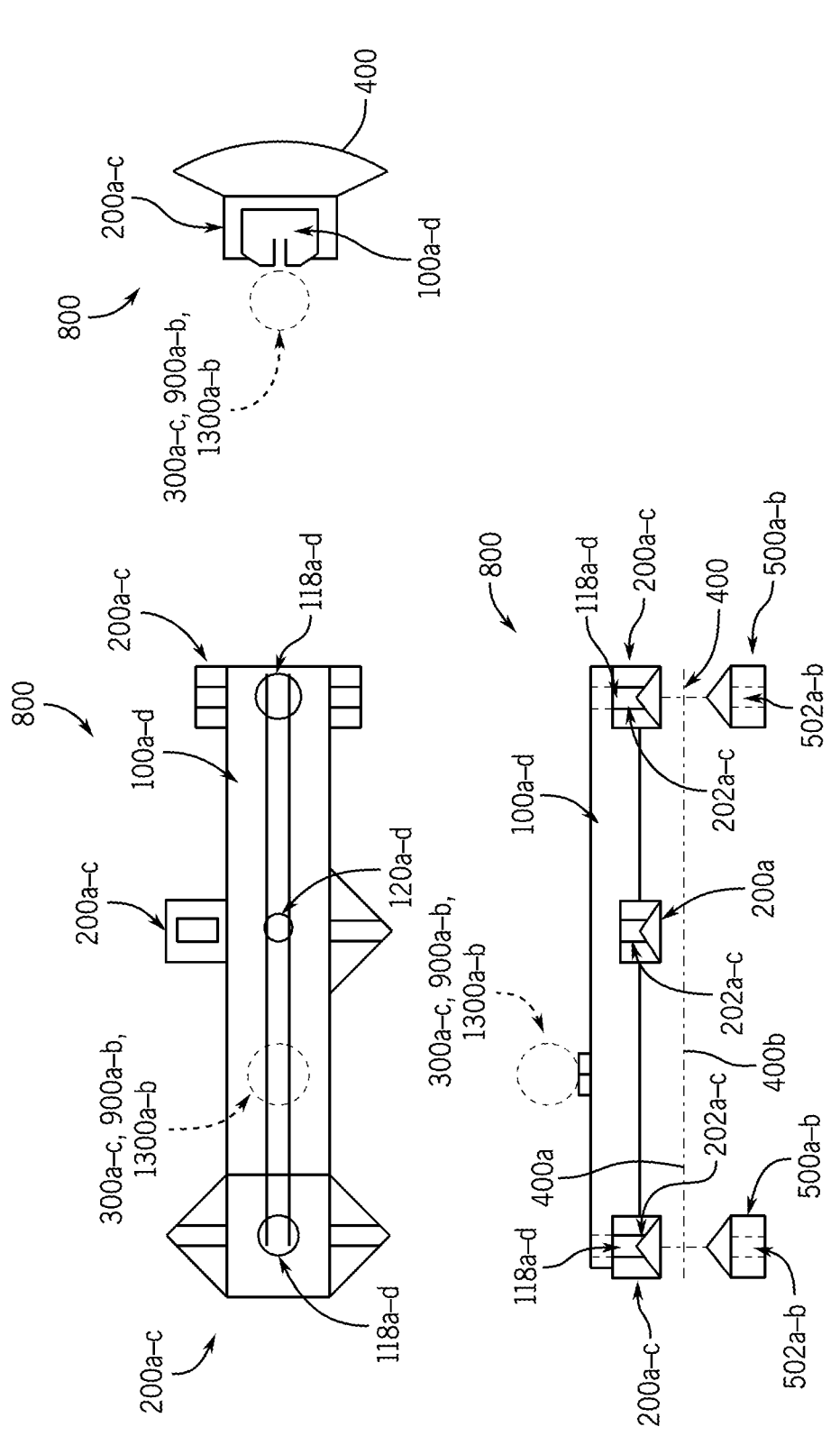
FIG. 4 shows illustrations of an illustrative rail system that includes the rail, end bases, intermediate base(s), and rail adapter(s) to attach an arm or electronic mounting mechanism.

With regard to FIG. 4, illustrations of an illustrative rail system 800 that includes the rail 100a-100d, outer bases 200a-200c, intermediate base(s) 200a-200c, and rail adapter(s) 300a-300c, 900a-900b, 1300a-1300b to attach an arm or electronic mounting mechanism is shown. It should be understood that the rail system is generic in that may represent any of the rails 100a-100d of FIG. 1. The outer bases 200a-200c may have inside wall profiles that are reciprocal to the shape of the outer walls of the bottom of the base and sidewalls of the rail 100a-100d. As shown in FIG. 2, the outer bases 200a-200c may include an end wall 212a-212c that is configured to cover an end of the rail 100a-100d so as to prevent a base 302a-302c of a rail adapter to slide out of the rail. The bases 200a-200c may be connected to the dashboard 400 using fastening members, such as screws, bolts, nuts, etc. Alternatively and/or additionally, an adhesive may be used to secure the base, rail, or other rail system components to the dashboard.

As shown in FIG. 4, sub-base component 500a-500b may be used to couple the outer bases 200a-200c to a substrate, shown as a vehicle dashboard 400. One or more sub-base components 500a-500b are disposed on a bottom side surface 400b of the dashboard 400 and the outer bases 200a-200c are disposed on an upper side surface 400a of the dashboard 400 opposite the sub-base components 500a-500b. A fastening device (e.g., bolt 600) may be inserted through an opening 118a-118d in the rail 100a-100d into the recessed opening 202a-202c of the base 200 and through an opening in the dashboard 400 (e.g., drilled opening, etc.), such that the fastening device threadably engages the sub-base component 500a-500b to secure the rail system 800 to the dashboard 400.

The bottom surface 204a'-204c' of the base 200a-200c may define one or more recessed openings 202a-202c as previously described with regard to FIG. 2. To simplify the formation of the recessed openings 202a-202c, the inner surface 204a"-204b" may define semi-circular regions or features directly above the recessed openings formed by a single tool a single tooling step. That is, a tool may be configured to drive or create an opening through portions of the inner surface 204a"-204b" and through the bottom wall 104a-104d of the rail. The semi-circular regions may thereafter be used by rail adapter (e.g., trackballs 300a-300c, 900a-900b, or 1300a-1300b) and/or bases for positioning purposes.

Figure 5:
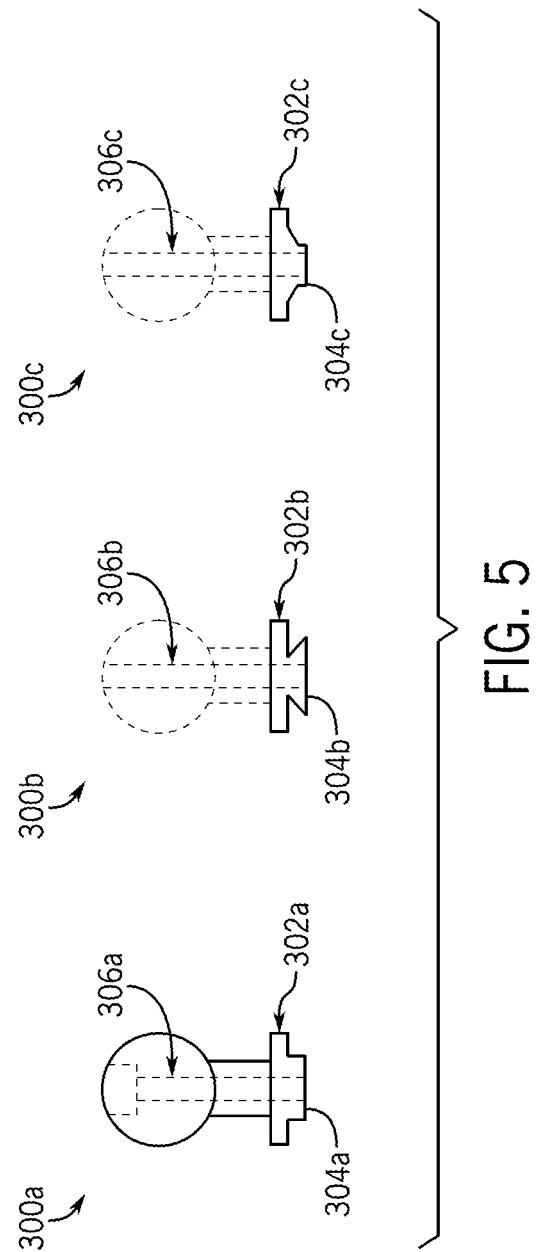
FIG. 5 shows illustrations of a rail adapter, in this case a trackball mounted to a base that includes a key portion that extends between top walls defined by or connected to sidewalls of a rail.

With regard to FIG. 5, illustrations of a rail adapter, in this case a trackball 300a-300c mounted to a base 302a-302c that includes a key portion 304a-304c that is configured to extend between top walls 108a-108d defined by or connected to sidewalls 106a-106d of a rail 100a-100d, are shown. The base 302a-302c may define various profiles that are reciprocal to an inner profile 102a-102d defined by the rail (see, for example, the top row of FIG. 1). A clamp (not shown) may be mounted to the trackball 300a-300c and an arm or other electronic holding mechanism (not shown) may connect to the trackball 300a-300c. The trackball 300a-300c and the base 302a-302c may have through-holes 306a-306c that enables a fastening member (e.g., a bolt) to extend through so as to cause the trackball 300a-300c and base 302a-302c to move towards each other, thereby operating as a clamp against opposite sides of top walls 108a-108d defined by side walls 106a-106d of the rail 100a-100d.

Figure 6:
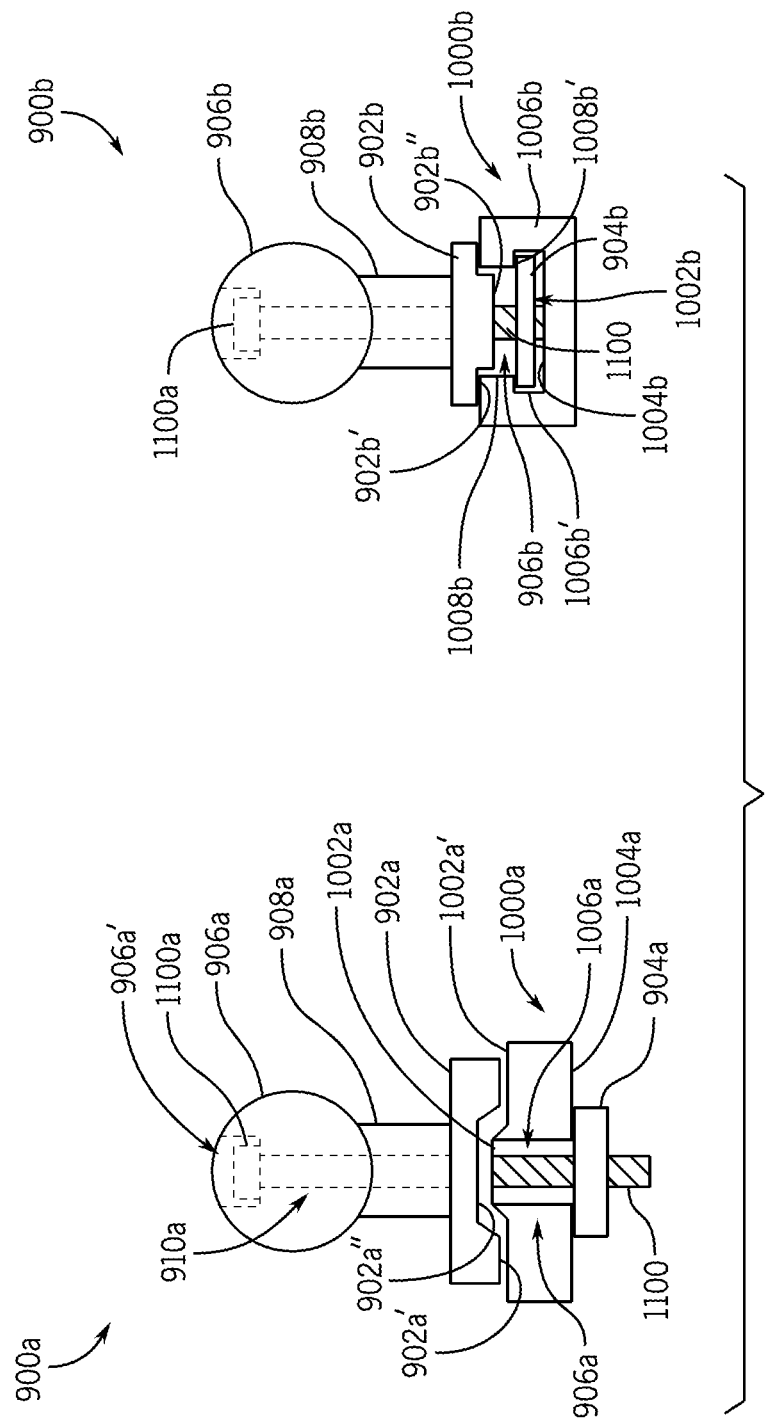
FIG. 6 shows illustrations of alternative configurations of rail a rail adapter, in this case a trackball, for mounting to a rail.

With regard to FIG. 6, illustrations of alternative configurations of a rail adapter, in this case a trackball 900a-900b, for mounting to a rail 1000a-1000b are shown. In this case, the rail adapter 900a-900b is formed of two elongated components 902a-902b and 904a-904b with a slot 906a-906b separating the two elongated components. The elongated components 902a-902b and 904a-904b may be attached separate or attachable to one another, respectively. In a first alternative embodiment, shown as rail adapter 900a, the rail adapter 900a may have a base 902a to which a ball 906a is connected that includes a bottom surface 902a' with an indentation 902a", and a rail 1000a may have a protrusion 1002a that is reciprocal to the indentation 902a". The indentation 902a" and protrusion 1002a may engage with one another, thereby operating as a key that prevents relative rotation of the rail adapter 900a and rail 1000a. In an embodiment, the protrusion 1002a of the rail 1000a may extend the entire length of the rail. Alternatively, the protrusion 1002a of the rail 1000a may be positioned at one or more defined locations along the rail 1000a such that the rail adapter 900a is slid along the rail 1000a and engaged at one of the defined location(s). The shape of the indentation 902a" of the rail adapter 900a is shown to be angled inward. It should be understood that alternative geometric or non-geometric shapes may be utilized for the indentation 902a". That is, the profile of the bottom surface 902a' of the base 902a of the rail adapter may have any number of shapes, and the protrusion 1002a of the rail may have a reciprocal profile.

As further shown, the ball 906a, shaft 908a, and base 902a may define an opening 910a that extends longitudinally from the top of the ball 906a through the bottom of the base 902a, and be configured to enable a fastening member or fastener, shown as a bolt 1100, to extend therethrough. The base 902a may be configured to enable the fastening member to extend through a top surface 1002a' and bottom surface 1004a of the rail 1000a. A retention member, such as a nut 904a, may be configured to extend across a channel 1006a defined by the rail 1000a, thereby preventing the fastening member from retracting from the rail 1000a. The fastening member and retention member, when tightened, may cause the rail adapter 900a to be retained in a releasably fixed position along the rail 1000a. It should be understood that the rail may alternatively be a bar mount (e.g., bar mount 1300), as further described hereinbelow with regard to FIG. 8. The ball 906a is shown to define a head portion 906a' that is recessed within the top of the ball 906a, thereby allowing a head 1100a of the fastening member to be recessed beneath the top of the ball 906a and prevent the ball 906a and rail adapter 900a from pulling away from the base.

In an alternative embodiment, shown as a rail adapter 900b in FIG. 6, the rail adapter 900b includes a ball 906b, shaft 908b, and base 902b. The base 902b has a bottom surface 902b' with a protrusion 902b" that extends downwards to pass through top walls 1008b that extend inwards from side walls 1006b, thereby operating as a key that prevents rotation of the base 902b of the rail adapter 900b relative to the inside surfaces 1008b' of the top walls 1008b. A fastening member, shown as bolt 1100, may extend through the rail adapter 900b in the same manner as rail adapter 900a, but rather than extending through a bottom surface of the rail, the fastening member may have a length that is above a bottom surface 1004b' of the rail 1000b and allows for a retention member, shown as the nut 904b, to be disposed on the fastening member and within a channel portion 1002b defined by the bottom surface 1004b', inner surfaces 1006b' of sidewalls 1006b, and bottom surface 1008b' of top walls 1008b that are spaced apart from one another.

Figure 7:
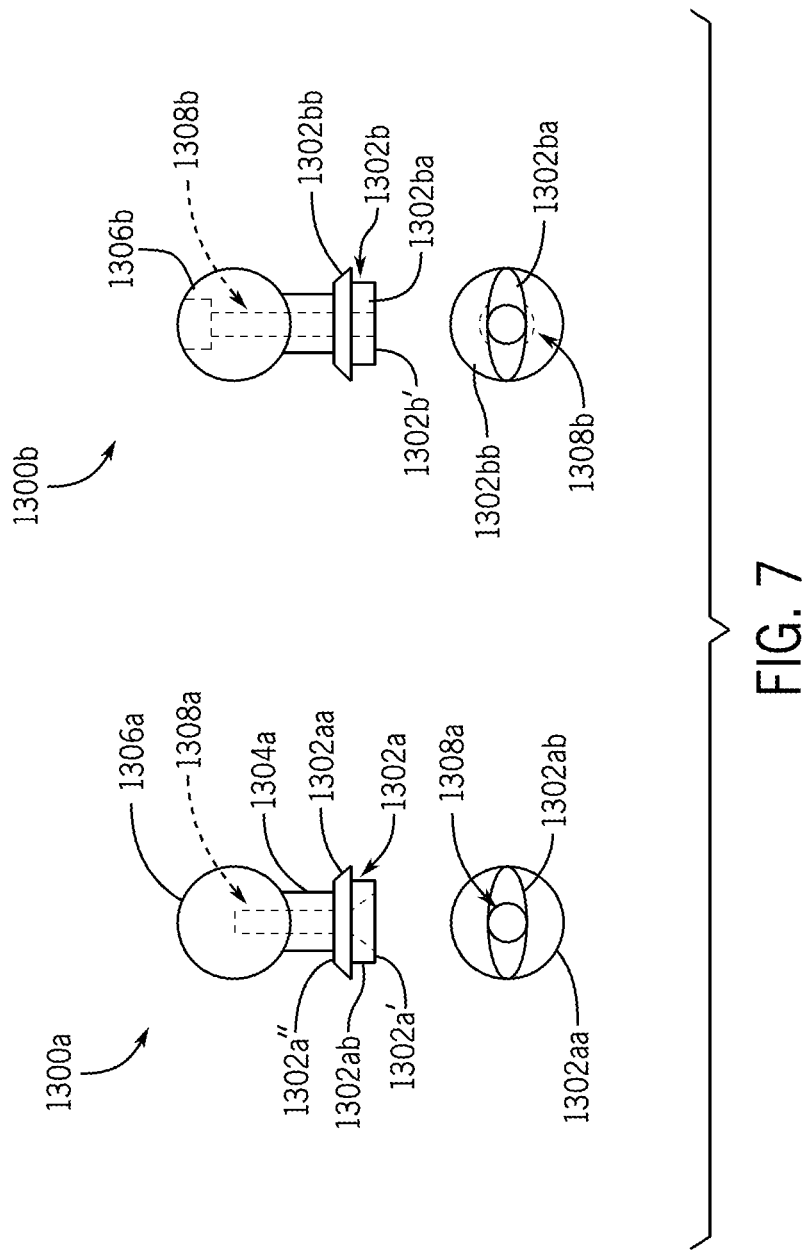
FIG. 7 shows illustrations of alternative embodiments of rail adapters that include anti-rotation members and regions for fastening members to be connected and/or retained by the rail adapters.

With regard to FIG. 7, illustrations of alternative embodiments of rail adapters 1300a-1300b that include anti-rotation members and regions for fastening members (e.g., bolt 1100) to be connected and/or retained by the rail adapters are shown. In a first embodiment, a rail adapter 1300a is shown to include a region 1308a (shown with dashes) that extends from a bottom 1302a' of a base 1302a, through a shaft 1304a, and into a ball 1306a. The region 1308a is sized to enable a fastening member, such as a bolt 1100, to extend into the rail adapter 1300a to retain the rail adapter 1300a with a rail. The base 1302a is shown to include an upper surface 1302a" on a flange portion 1302aa and a protrusion 1302ab that may operate as a key that prevents rotation of the base 1302a and rail mount relative to a rail. The rail adapter 1300a may alternatively be configured to mount to a fixed position bar mount, plate, or otherwise. In an embodiment, and as shown, the region 1308a may be configured to enable a head 1100*a* of a fastening member 1100 to be recessed therein. The bottom profiles of the flange portion 1302*aa* and protrusion 1302*ab* are also shown, where the protrusion 1302*ab* may be configured to have an ovular or elongated shape with rounded ends such that a slot or indentation into which the protrusion extends may be formed by a conventional rotating tool. Beneath the rail adapter 1300*a* is a bottom view showing a protrusion 1302*ab* that is used as an anti-rotation feature.

In a second embodiment shown in FIG. 7, a rail adapter 1300*b* includes a region 1308*b* for a fastening member (e.g., bolt 1100) that may extend through a top surface of the ball 1306*b*, and extend through a bottom surface 1302*b'* of a base 1302*b* and protrusion 1302*ba*. The protrusion 1302*ba* may be elongated with rounded tips, as shown. It should be understood that the specific shapes of the two embodiments may vary, but provide the same or similar functionality. In an alternative embodiment, for example, both protrusion(s) (e.g., protrusions 1302*ab*, 1302*ba*) and recession(s) may be used to maintain the rail adapter (or bar mount adapter) to be aligned with a structure (e.g., rail, bar mount, plate, etc.) and prevented from rotating. In yet another embodiment, multiple features may be used for alignment and anti-rotation purposes. For any of the embodiments of the rail adapter, the rail adapter may be formed from a single monolithic material so as to be a single element or multiple elements formed of the same or different materials may be utilized. Beneath the rail adapter is a bottom view showing a protrusion 1302*ab*-1302*ba* that is used as an anti-rotation feature. It should be understood that rather than using a protrusion, the feature may be an indentation and the rail may have a reciprocal protrusion, thereby acting as an anti-rotation feature, as described further herein.

With regard to FIGS. 10-14, illustrations of alternative embodiments of a rail adapter 1800 that includes anti-rotation features and regions for fastening members to be connected and/or retained by the rail adapters are shown. The rail adapter 1800 is shown as a trackball or ball mount that includes a ball 1802, a shaft 1804, and a base 1806. The base 1806 and/or shaft 1804 may define an opening 1808 that extends longitudinally therethrough, and be configured to enable a fastening member or fastener, shown as a bolt 1900, to extend therethrough. In other embodiments, the opening 1808 may be at least partially threaded to enable a fastening member to threadably engage the rail adapter 1800. In yet another embodiment, a threaded stud or bolt may extend directly from a bottom surface 1806*a* of the base 1806, and may be configured to receive a retaining member thereon, such as a nut, so as to attach the rail adapter to a rail (e.g., rails 100*a*-100*d*).

Still referring to FIGS. 10-14, the base 1806 includes a bottom surface 1806*a*, an upper surface 1806*b*, first side surface 1806*c*, and second side surfaces 1806*d*. The first side surface 1806*c* extends from the second side surfaces 1806*d* to the upper surface 1806*b*. The first side surface 1806*c* has a generally frusto-conical shape and tapers inwardly from the second side surfaces 1806*d* to the upper surface 1806*b*. It should be appreciated, however, that the first side surface 1806*c* may be oriented differently or have a different profile or shape than depicted. The second side surfaces 1806*d* are arranged to define a plurality of facets or flat edges extending along an outer periphery of the base 1806. The base 1806 may include any number of facets arranged to define a geometric cross-sectional shape, such as a pentagon, a hexagon, an octagon, a heptagon, a decagon, or any other geometric shape that is defined by one more straight/flat edges or defined by linear, curved (e.g., oval, circular with a sine wave profile), or any curvilinear shape. The second side surfaces 1806*d* extend in a generally upright or vertical direction from the bottom surface 1806*a* to the first side surface 1806*c*, although it should be appreciated that the second side surfaces 1806*d* may be oriented at an acute angle or an obtuse angle relative to a plane defined by the bottom surface 1806*a*.

The orientation of the second side surfaces 1806*d* is such that the second side surfaces 1806*d* collectively define an outer surface profile that is reciprocal to an internal surface profile of a rail channel (e.g., internal profiles 102*a*-102*d* of rails 100*a*-100*d*) or any other mechanism that interfaces with the base 1806. In this manner, the second side surfaces 1806*d* can act as a key or anti-rotation feature that can help to prevent rotation of the rail adapter 1800 relative to a rail when the rail adapter 1800 is inserted into the rail channel, thereby eliminating the need for any additional components or sub-components to couple the rail adapter 1800 to the rail.

In another embodiment, the rail (e.g., rails 100*a*-100*d*) itself may have a protrusion that defines a plurality of facets similar to the outer profile of the second side surfaces 1806*d*, and the base 1806 of the rail adapter 1800 may have a cavity or recess that is defined by an internal surface profile that is reciprocal to the outer profile of the protrusion, such that the protrusion and cavity function as an anti-rotation feature for the rail adapter 1800. It should be appreciated that the rail adapter and rail may include any combination of cavities and/or protrusions with any geometric or non-geometric shape that cooperate to function as anti-rotation features. It should also be understood that the faceted shape of the base 1806 may further provide for an interesting ornamental appearance as compared to conventional bases that are circular.

One embodiment of a rail mount system may include a rail 102*a*-102*d* defined by a first side wall 106*a*-106*d* and a second side wall 106*a*-106*d* that opposes the first side wall. The first and second side walls 106*a*-106*d* may define respective external wall surfaces 106*a'*-106*d'* and internal wall surfaces 106*a"*-106*d"*. The first side wall 106*a*-106*d* may define a first top wall 108*a*-108*d* and second side wall 106*a*-106*d* may define a second top wall 108*a*-108*d*, where each of the top walls 108*a*-108*d* have bottom surfaces 108*a"*-108*d"* that extend inward from the first and second internal surfaces 106*a"*-106*d"* of the side walls. A bottom wall 104*a*-104*d* may be monolithic with the first and second side walls 106*a*-106*d*. The external side wall surfaces 106*a'*-106*d'* may form opposing, inwardly acute angles θa-θd relative to a bottom surface 104*a'*-104*d'* of the bottom wall. The bottom wall 104*a*-104*d* may define multiple recessed openings 112 to enable first fastening members to secure the rail to a structural feature (e.g., dashboard, side wall, roof, etc.) of a vehicle. A rail adapter 300*a*-300*c*, 900*a*-900*b*, 1300*a*-1300*b*, may include a feature that retains and enables sliding of the rail adapter within a channel defined by the internal surfaces 106*a"*-106*d"* of the sidewalls 106*a*-106*d*, bottom surfaces 108*a"*-108*d"* of the top walls 108*a*-108*d*, and inner surface 104*a"*-104*d"* of the bottom wall 104*a*-104*d*. One or more base components (e.g., bases 200*a*-200*c*) may each have a bottom surface 204*a*-204*c* and sidewalls 206*a*-206*c* with reciprocal profiles of the external surfaces (e.g., outer side wall surfaces 106*a'*-106*d'*, bottom surfaces 104*a'*-104*d'*, top surfaces 108*a'*-108*d'*) of the rail. In an embodiment, the base components may include a pair of outer bases (e.g., outer bases 200*a*-200*c* shown in FIG. 4). The bottom surface 204*a*-204*c* may define openings 202*a*-202*c* to be aligned with the recessed openings of the bottom wall 104*a*-104*d* of the rail 100*a*-100*d* to enable the fastening members to extend through the aligned openings to secure the outer base components 200a-200c disposed beneath the rail 100a-100d to the structural feature of the vehicle.

In an embodiment, the base component(s) 200a-200c may be configured to slide onto an end of the rail 100a-100d and along the rail to align the openings of both the bottom wall 104a-104d of the rail and the bottom wall 204a-204c of the base component(s) 200a-200c. The base component(s) may have an end wall 212a-212c perpendicular to the side walls 206a-206c, and be configured to engage respective ends of the rail 100a-100d such that when the base component(s) 200a-200c, such as the outer base component(s) 200a-200c, are engaged to the rail with end walls 212a-212c of the base component(s) that are perpendicular to the axial shape of the rail are in contact with the ends of the rail that the openings 202a-202c defined by the base component(s) are aligned with respective recessed openings 118a-118d defined by the bottom wall 104a-104d of the rail. In an embodiment, rather than the outer base component(s) 200a-200c being used to prevent the rail adapter from sliding off the rail, a stopper (not shown) that is configured to be positioned within the channel of the rail may be utilized. The stopper may have any shape and be formed of any material. For example, the stopper operate as a cork at the end of the rail. Alternatively, the stopper may be extended into a channel of the rail. The stopper may be fully or partially within the channel, and be capable of preventing the rail adapter from sliding off of the rail. The stopper may be formed of any material, including rubber, plastic, metal, silicon, and/or any other material.

The bottom surface 104a'-104d' of the bottom wall 104a-104d may define at least one groove 112 that extends parallel to the channel. The base(s) 200a-200c may include at least one protrusion 212a-212b that aligns with and extends into the groove(s) 112 so as to operate as an alignment feature when mating the base component(s) 200a-200c and rail 100a-100d. In an alternative embodiment, rather than the bottom surface 104a'104d' of the bottom wall 104a-104d including a groove, the bottom wall 104a-104d may include at least one protrusion 114 and the base component(s) 200a-200c may have at least one groove 214a. Still yet, the bottom surface 104a'104d' of the bottom wall 104a-104d may include both a groove and protrusion, and the base component(s) 200a-200c may have reciprocal protrusion(s) and groove(s). Other alignment or key features may also be included on the bottom surface 104a'-104d' of the bottom wall 104a-104d and base component(s) 200a-200c. Although the base 200a-200c is shown to be circular, it should be understood that alternative shapes may be utilized.

The bottom wall 104a-104d may further define an intermediate opening 120a-120d between the recessed openings 118a-118d. An intermediate base component 200a-200c having an inner surface 204a"-204c" and inner sidewall surfaces 206a"-206c" with reciprocal profiles of the external sidewalls of the rail 100a-100d. The bottom wall 204a-204c of the intermediate base component 200a-200c may define an opening 202a-202c that aligns with the intermediate opening 120a-120d when the intermediate base 200a-200c is engaged with the rail 100a-100d and positioned at the intermediate opening.

In an embodiment, the intermediate opening 120a-120d defines a threaded sidewall.

The bottom surfaces 204a'-204c' of each of the base component(s) 200a-200c may have a recess section 210a-210c that maintains a gap between a top surface 400a of a dashboard 400 on which the base component(s) 200a-200c are positioned, thereby enabling a head of a fastening component that is mounted to the dashboard surface to be covered by a bottom surface 204a'-204c' and within a space defined by the recess section 210a-210c of the base component(s) 200a-200c and top of the dashboard surface. In an embodiment, the fastening component includes a rivnut.

In an embodiment, the base component(s) 200a-200c are linear. In an alternative embodiment, the base component(s) 200a-200c are at least partially non-linear. The base components 200a-200c may be reciprocally identical. Alternatively, the base components 200a-200c may be reciprocally different from one another.

The system may further include a sub-surface base component 500a-500b that is at least partially non-linear and configured to receive a fastening member via a connection socket defined by a recess 502a-502b with threaded sides 502a'-502b' of the sub-surface base component 500a-500b that vertically aligns with a connection socket defined by a recessed opening 202a-202c of the base component(s) 200a-200c through which the fastening member extends from a top side of the dashboard.

In an embodiment, a base plate 500a onto which the rail may be attached. The base plate 500a may be configured (e.g., shaped) to connect to a surface 400a of the structural feature of the vehicle.

The structural feature may be a dashboard 400 or any other structural feature of a vehicle or non-vehicle.

It should be understood that various processes for manufacturing, assembling, and installing the vehicular mounted rail system using the hardware components described herein.

Bar Mount

Figure 8:
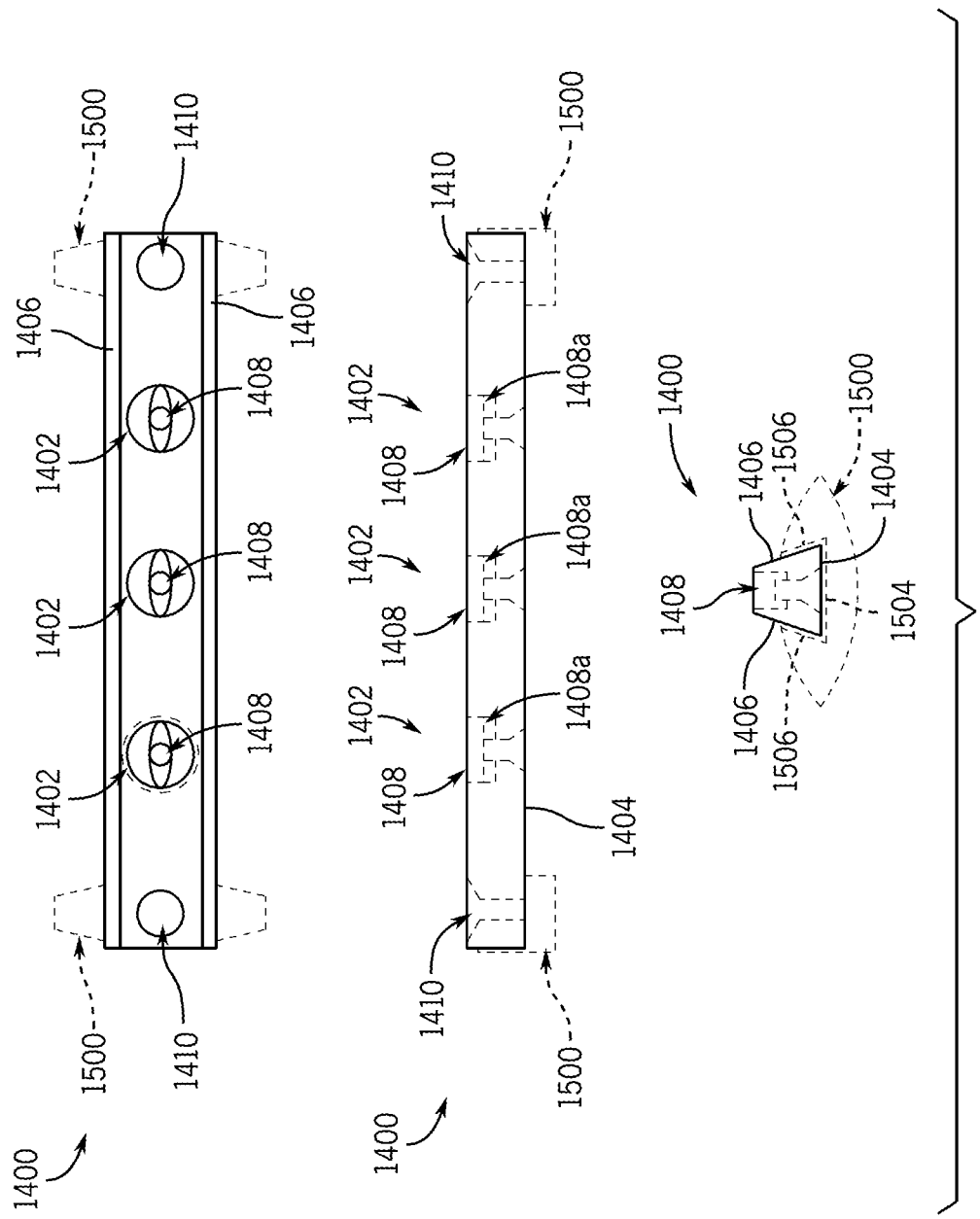
FIG. 8 shows illustrations of an illustrative bar mount.

As an alternative to a rail, FIG. 8 is an illustration of an illustrative bar mount 1400. The bar mount 1400 may be configured with one or more fixed positions for bar mount adapter(s) (e.g., trackballs 300a-300c, 900a-900b, 1300a-1300b) to be positioned. In contrast to a rail that has a slide for a rail adapter to be selectively positioned by a user using fastening member(s), the bar mount 1400 may be configured with one or more fixed positions 1402 for a bar mount adapter to be positioned. A fixed position 1402 may be a location or seat adapted to receive a base (e.g., base 302a-302c, 902a-902b, 1302a-1302b) of the bar mount adapter. The fixed position 1402 may include one or more features that enable the bar mount adapter to be held in position and prevented from rotating. As shown, the bar mount 1400 may be an elongated piece of material, such as metal, plastic, ceramic, aluminum, and/or any other rigid material with position(s) disposed at a top surface. The rails described hereinabove may be formed of any of the materials, as well.

In the embodiment shown, there are three fixed positions 1402 at which bar mount adapters may be attached to the bar mount 1400. Each of the positions may define a feature, such as a recess, into which a base of the bar mount adapter may be aligned and positioned. Alternatively, rather than the features being a recess, the features may include protrusion(s) that engage recess(es) on bar mount adapters. The features may be the same or different at each position. To restrict or prevent rotation of the bar mount adapter, the feature may be as a slot, indentation, and/or protrusion, and be disposed at the position (e.g., extending into or from a surface of the position). To retain a bar mount adapter with the bar mount 1400, the bar mount may define an opening 1408 partially or entirely through the bar mount 1400 so that fastening member(s) may be used to temporarily attach the bar mount adapter(s) to the bar mount. The opening 1408 may be configured with a recess(es) 1408a so that heads of fastening members or bases may be positioned below or above the surface of the respective top surface or bottom surface of the bar mount.

Base members 1500 that are adapted to retain the bar mount 1400 may be configured to be shaped and connected to a surface of a structural feature of a vehicle (or non-vehicle). Two base members 1500, one at each end of the bar mount 1400, are shown. It should be understood that more or fewer than two base members 1500 may be utilized. The bar mount 1400 may be shaped so that the base member 1500 may have reciprocal shapes to retain the bar mount 1400 from vertical, horizontal, and/or axial directions. The bar mount 1400 may define an opening 14010 through which fastening member(s) (e.g., bolt 600) may extend to connect the bar mount 1400 to the base members 1500 or through the bar mount 1400 and through a surface of a structural feature (e.g., dashboard) on which the base members 1500 are positioned. The bar mount 1400 may have the same or similar bottom and/or external side wall shapes, as previously described. Again, to maintain the bar mount 1400 in position when mounted to a structural feature, the base members 1500 may have a reciprocal shape, as described above.

A retention member (e.g., nut 700) may be positioned on an opposite side of the structural feature, thereby preventing the bar mount 1400 from separating from the structural feature (e.g., dashboard 400) and maintaining a strong connection (e.g., prevent relative rotation or translation) between the bar mount 1400 and the structural feature. As shown in the bottom row, the bar mount 1400 may have inwardly angled sidewalls 1406, and base member(s) 1500 may have inside walls 1506 that are reciprocally inwardly angled, such that when the bar mount 1400 and base member(s) 1500 are engaged, the bar mount 1400 is unable to separate vertically from the base member(s) 1500. The base member(s) 1500 may have a bottom wall 1504 that defines any external surface profile to be mounted to a surface of a structural feature, such as a vehicle dashboard. Similarly, a bottom wall 1404 of the bar mount may have any shape to be mounted to a surface of a structural feature.

Figure 9:
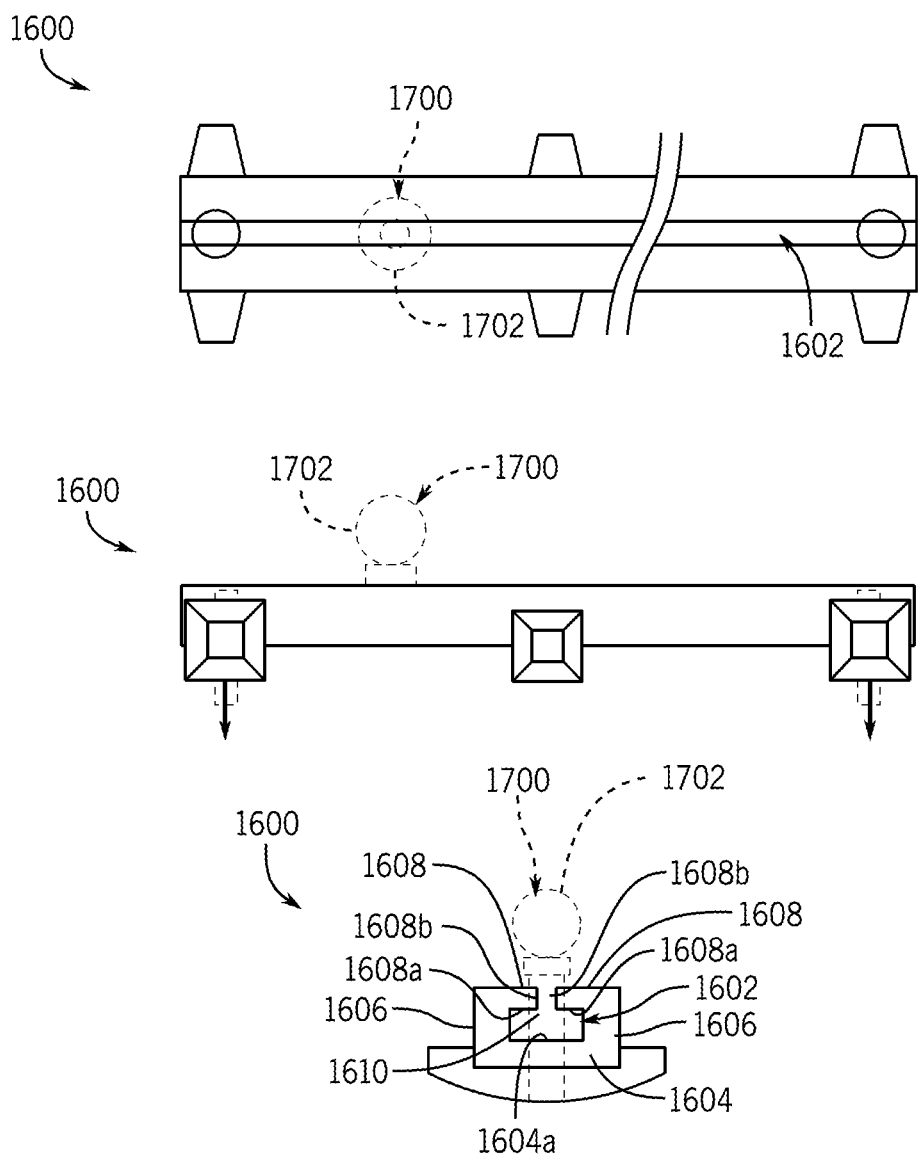
FIG. 9 shows illustrations of an illustrative rail.
Figure 10:
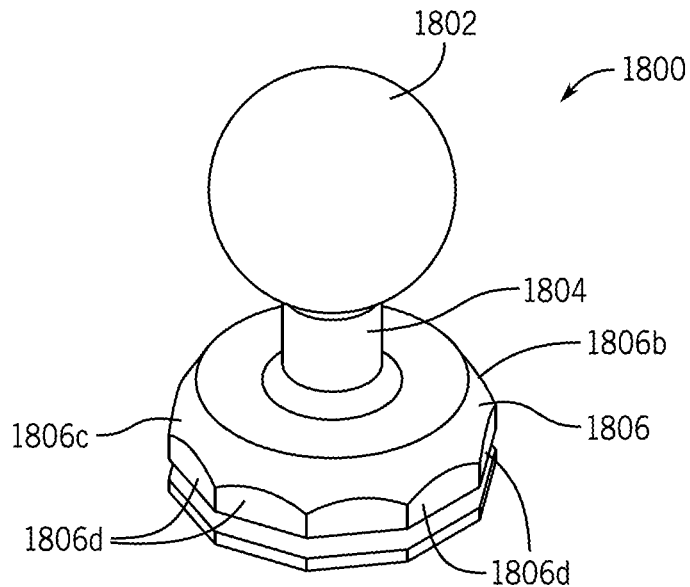
FIGS. 10-14 show illustrations of an illustrative rail adapter, in this case a trackball, for mounting to a rail.
Figure 11:
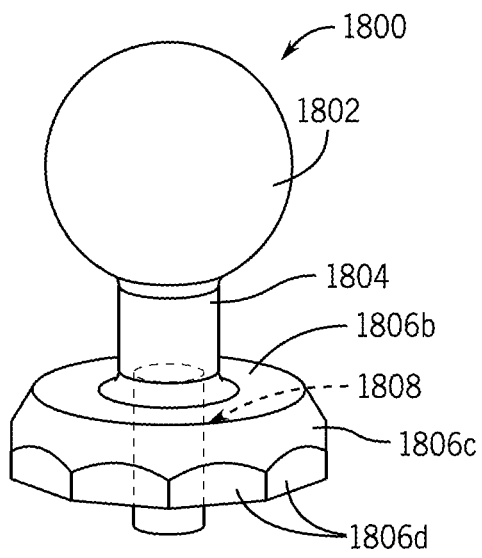
Figure 12:
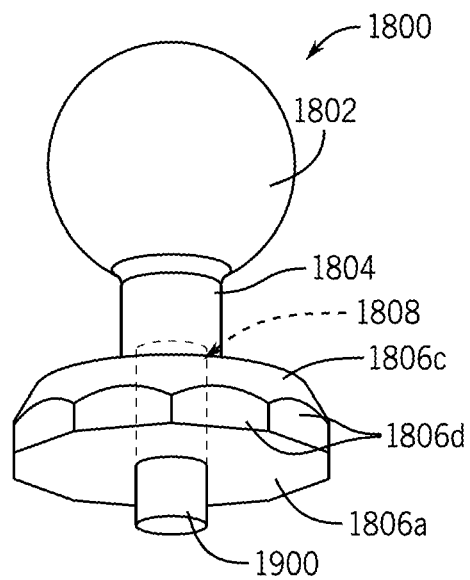
Figure 13:
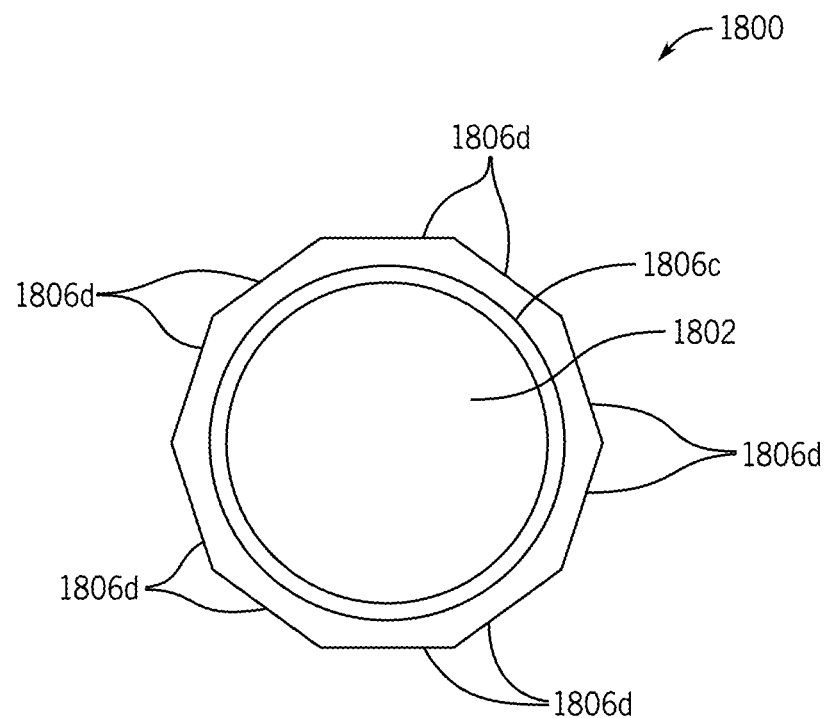
Figure 14:
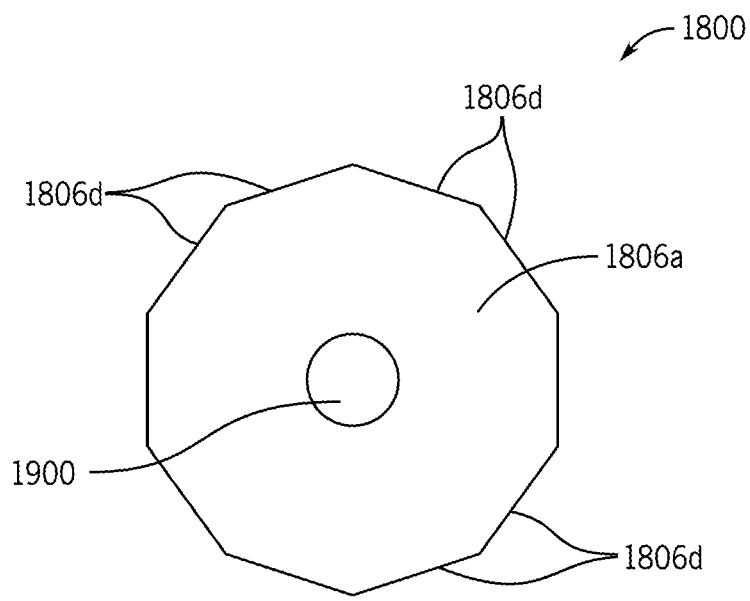

With regard to FIG. 9, illustrations of an illustrative rail 1600 are shown. The illustrations show a top view, side view, and end view of the rail 1600. The rail 1600 is shown to be an elongated member having a channel 1602, which is a region defined by sidewalls 1606, top surface 1604a of a bottom wall 1604, and bottom surfaces 1608a of top walls 1608 extending inwards from the sidewalls 1606. A space 1610 between inside surfaces 1608b of the top walls 1608 may enable a rail adapter shown as a trackball 1700, which has the same configuration as the trackballs 300a-300c, 900a-900b, or 1300a-1300b disclosed herein, to extend through to allow the rail adapter 1700 to slide along the rail 1600. As previously shown with reference to track balls 300a-300c, 900a-900b, 1300a-1300b, the rail adapter may be configured to be secured at any location along the rail 1600. The rail adapter 1700 may have a ball 1702 disposed thereon, but alternatively shaped adapters may be used, as well.

An embodiment of a vehicular mounting system for supporting an electronic device may include an elongated member defined by a bottom surface and sidewalls, the sidewalls having external surfaces being inwardly angled or curved. An adapter may include a feature that is configured to be supported by the elongated member. One or more base components may each have a bottom surface and sidewalls with reciprocal profiles of external surfaces of the sidewalls of the elongated member. The respective bottom surfaces of the base component(s) may define openings to be aligned with openings of the bottom wall of the elongated member to enable fastening members to extend through the aligned openings to secure the base component(s) disposed beneath the elongated member to a structural feature of the vehicle.

The elongated member may be a rail. The elongated member may be a bar mount. A profile of the bottom surface and external surfaces of the sidewalls of the elongated member may be trapezoidal. The adapter may include a ball, a shaft connected to and extending from the ball, and a base connected to an opposite end of the shaft. The base may be configured to mate with at least one feature defined by the elongated member.

The elongated member may include a protrusion and the base of the adapter may include a recess that is a reciprocal with the protrusion such that when the adapter is mated with the base, the adapter is prevented from rotating. The protrusion may be elongated with curved ends.

The elongated member may include a recess and the base of the adapter may include a protrusion that is a reciprocal with the recess such that when the adapter is mated with the elongated member, the adapter is prevented from rotating. The protrusion may be elongated with curved ends. The elongated member may define one or more locations at which the adapter is connectable. The location(s) may include a recess into which a bottom wall of the adapter is positioned.

A method of manufacturing the elongated member, adapter, and base components may be performed in a number of ways described herein. If the elongated member is a bar mount, then discrete locations may be formed to mate with a base of the adapter. The discrete locations may include a recess, protrusion, or both, and be configured to be reciprocal to features on a bottom surface of the adapter. In an embodiment, a tool may be used to form an elongated recess with curved ends that is reciprocal to a protrusion of a bottom surface of a base of the adapter.

The previous description is of a preferred embodiment for implementing the invention, and the scope of the invention should not necessarily be limited by this description. The scope of the present invention is instead defined by the following claims.

What is claimed is:

1. A mounting system for supporting an electronic device, the system comprising:
    a mount defining a first opening, the mount including an elongated member that defines a rail and includes a base and a plurality of sidewalls extending from the base, the plurality of sidewalls including a pair of parallel sidewalls spaced apart from one another, at least one sidewall of the plurality of sidewalls defining a side surface that is inwardly angled from a reference plane along which a surface of the base extends;
    an adapter including a first feature configured to be supported by the mount, the first feature configured to mate with the mount to prevent relative rotation between the mount and the adapter; and
    a base component configured to enable securing the mount to a structural feature of a system in which the mounting system is being transported while supporting the electronic device, the base component defining a second opening that aligns with the first opening of the mount to enable the mount to be connected to the base component.

2. The system according to claim 1, wherein the side surface is an external side surface of the at least one sidewall.

3. The system according to claim 2, wherein the elongated member is one of a bar mount or a rail.

4. The system according to claim 2, wherein the elongated member further defines a bottom surface, a profile of the bottom surface and the external surfaces together is trapezoidal.

5. The system according to claim 1, wherein the mount defines a second feature that is shaped reciprocal to the first feature, such that when the adapter is mated with the mount, the adapter is prevented from rotating.

6. The system according to claim 1, wherein the mount includes a protrusion and the first feature of the adapter includes a recess that is a reciprocal with the protrusion such that the protrusion of the mount extends into the recess of the adapter, thereby restricting rotation of the adapter relative to the mount when the adapter is mated with the mount.

7. The system according to claim 6, wherein the protrusion is elongated with curved ends.

8. The system according to claim 1, wherein the mount includes a recess and the first feature of the adapter includes a protrusion that is a reciprocal with the recess such that the protrusion of the adapter extends into the recess of the mount, thereby restricting rotation of the adapter relative to the mount when the adapter is mated with the mount.

9. The system according to claim 8, wherein the protrusion is elongated with curved ends.

10. The system according to claim 1, wherein the adapter includes:
an adapter feature;
a shaft connected to a first portion of the adapter feature at a first end of the shaft, the shaft radially extending from the adapter feature; and
the base connected to a second end of the shaft opposite the first end, the first feature disposed on the base.

11. The system according to claim 1, wherein the mount defines a plurality of locations at which the adapter is connectable.

12. The system according to claim 1, wherein the mount defines a recess into which a base portion of the adapter is positioned, the mount including a second feature that is shaped reciprocal to the first feature, the second feature disposed in the recess.

13. The system according to claim 1, wherein the first feature comprises a key that is insertable into a reciprocal feature defined by the mount.

14. The system according to claim 1, wherein the first opening of the mount is defined by the surface, the second opening of the base component is defined by a bottom surface of the base component, the second opening of the base component configured to align with the first opening of the mount to enable fastening members to extend through the first opening and the second opening to secure the base component disposed beneath the mount to the structural feature.

15. The system according to claim 1, wherein the first feature is offset from an axial center location of the adapter.

16. An adapter for use in a mounting system for supporting an electronic device, comprising:
an adapter feature;
a shaft having a first axial end and a second axial end, the first axial end connected to the adapter feature;
a base connected to the second axial end of the shaft;
a feature coupled to the base and configured to mate with a mount to prevent rotation of the base relative to the mount, the feature including a protrusion defining a bottom surface and a plurality of side surfaces that are inwardly angled relative to the bottom surface; and
an opening extending from an axial end and an axial center of the base, through the shaft, and into the adapter feature.

17. The adapter according to claim 16, wherein the plurality of side surfaces defines a key.

18. The adapter according to claim 16, wherein the protrusion is engaged with and extends axially away from an opposite axial end of the base as the shaft.

19. The adapter according to claim 18, wherein the base includes a flange that circumscribes the protrusion.

20. The adapter according to claim 16, wherein the feature includes an elongated protrusion that extends radially across the base.

21. The adapter according to claim 16, wherein the feature includes an elongated recess defined by the base that extends radially across the base.

22. The adapter according to claim 16, wherein the plurality of side surfaces extend along an outer perimeter of the base.

23. The adapter according to claim 16, wherein the mount is a rail and the feature is configured to slide within the rail.

24. An adapter for use in a mounting system for supporting an electronic device, comprising:
a spherical adapter feature;
a shaft having a first axial end and a second axial end, the first axial end connected to the spherical adapter feature;
a base connected to the second axial end of the shaft; and
a feature coupled to the base and configured to mate with a mount to prevent rotation of the base relative to the mount, the feature including a protrusion defining a bottom surface and a plurality of side surfaces that are inwardly angled relative to the bottom surface.

25. The system according to claim 1, wherein the side surface is an internal side surface of the at least one sidewall.

26. The adapter according to claim 24, wherein the plurality of side surfaces defines a key.

27. The adapter according to claim 24, wherein the protrusion is engaged with and extends axially away from an opposite axial end of the base as the shaft.

28. The adapter according to claim 27, wherein the base includes a flange that circumscribes the protrusion.

29. The adapter according to claim 24, wherein the feature includes an elongated protrusion that extends radially across the base.

30. The adapter according to claim 24, wherein the plurality of side surfaces extend along an outer perimeter of the base.

* * * * *